United States Patent
Ito

(10) Patent No.: US 11,243,719 B2
(45) Date of Patent: Feb. 8, 2022

(54) WIRELESS COMMUNICATION ENABLED STORAGE DEVICE AND CONTROL METHOD THEREFOR

(71) Applicant: TOSHIBA MEMORY CORPORATION, Minato-ku (JP)

(72) Inventor: Kuniaki Ito, Funabashi (JP)

(73) Assignee: TOSHIBA MEMORY CORPORATION, Minato-ku (JP)

( * ) Notice: Subject to any disclaimer, the term of this patent is extended or adjusted under 35 U.S.C. 154(b) by 48 days.

(21) Appl. No.: 16/563,555

(22) Filed: Sep. 6, 2019

(65) Prior Publication Data

US 2020/0272334 A1 Aug. 27, 2020

(30) Foreign Application Priority Data

Feb. 27, 2019 (JP) .............................. JP2019-034709

(51) Int. Cl.
*G06F 3/06* (2006.01)
*G06F 16/17* (2019.01)
*H04L 29/08* (2006.01)

(52) U.S. Cl.
CPC ............ *G06F 3/067* (2013.01); *G06F 3/0604* (2013.01); *G06F 3/0631* (2013.01); *G06F 16/1734* (2019.01); *H04L 67/1097* (2013.01)

(58) Field of Classification Search
CPC ............. H04L 67/1097; G06F 16/1734; G06F 3/0604; G06F 3/0631; G06F 3/0659; G06F 3/067; G06F 3/0673
USPC ........................................................ 711/154
See application file for complete search history.

(56) References Cited

U.S. PATENT DOCUMENTS

| 2002/0141095 A1* | 10/2002 | Yahiro ................ H04M 15/854 360/69 |
| 2008/0069358 A1* | 3/2008 | Yang ....................... G06F 21/78 380/247 |
| 2011/0207405 A1* | 8/2011 | Minemura ........... H04B 5/0031 455/41.2 |

(Continued)

FOREIGN PATENT DOCUMENTS

| JP | 2012-168866 A | 9/2012 |
| JP | 2013-30233 A | 2/2013 |

(Continued)

*Primary Examiner* — Hashem Farrokh
(74) *Attorney, Agent, or Firm* — Oblon, McClelland, Maier & Neustadt, L.L.P.

(57) ABSTRACT

According to one embodiment, a storage device includes a non-volatile memory, an interface circuit, a first control circuit, a wireless transmitting and receiving circuit, and a second control circuit. The interface circuit is electrically connected to the host device and is capable of communicating the host device. The first control circuit performs control of writing write data received from the host device via the interface circuit into the non-volatile memory. The wireless transmitting and receiving circuit is capable of wirelessly communicating with a wireless device. The second control circuit determines whether or not the write data include a predetermined type of data based on measurement data of the write data, and stops wireless communication performed by the wireless transmitting and receiving circuit if it is determined that the write data include the predetermined type of data.

17 Claims, 6 Drawing Sheets

(56) References Cited

U.S. PATENT DOCUMENTS

| | | | |
|---|---|---|---|
| 2012/0210046 A1* | 8/2012 | Ito | H04W 4/60 711/103 |
| 2012/0288252 A1 | 11/2012 | Iwashita | |
| 2013/0121502 A1* | 5/2013 | Fujii | H04R 27/00 381/77 |
| 2016/0203086 A1* | 7/2016 | Ng | G06F 21/00 713/193 |
| 2017/0180625 A1 | 6/2017 | Ishizu | |

FOREIGN PATENT DOCUMENTS

| | | |
|---|---|---|
| JP | 2017-112541 A | 6/2017 |
| JP | 2017-117322 A | 6/2017 |

* cited by examiner

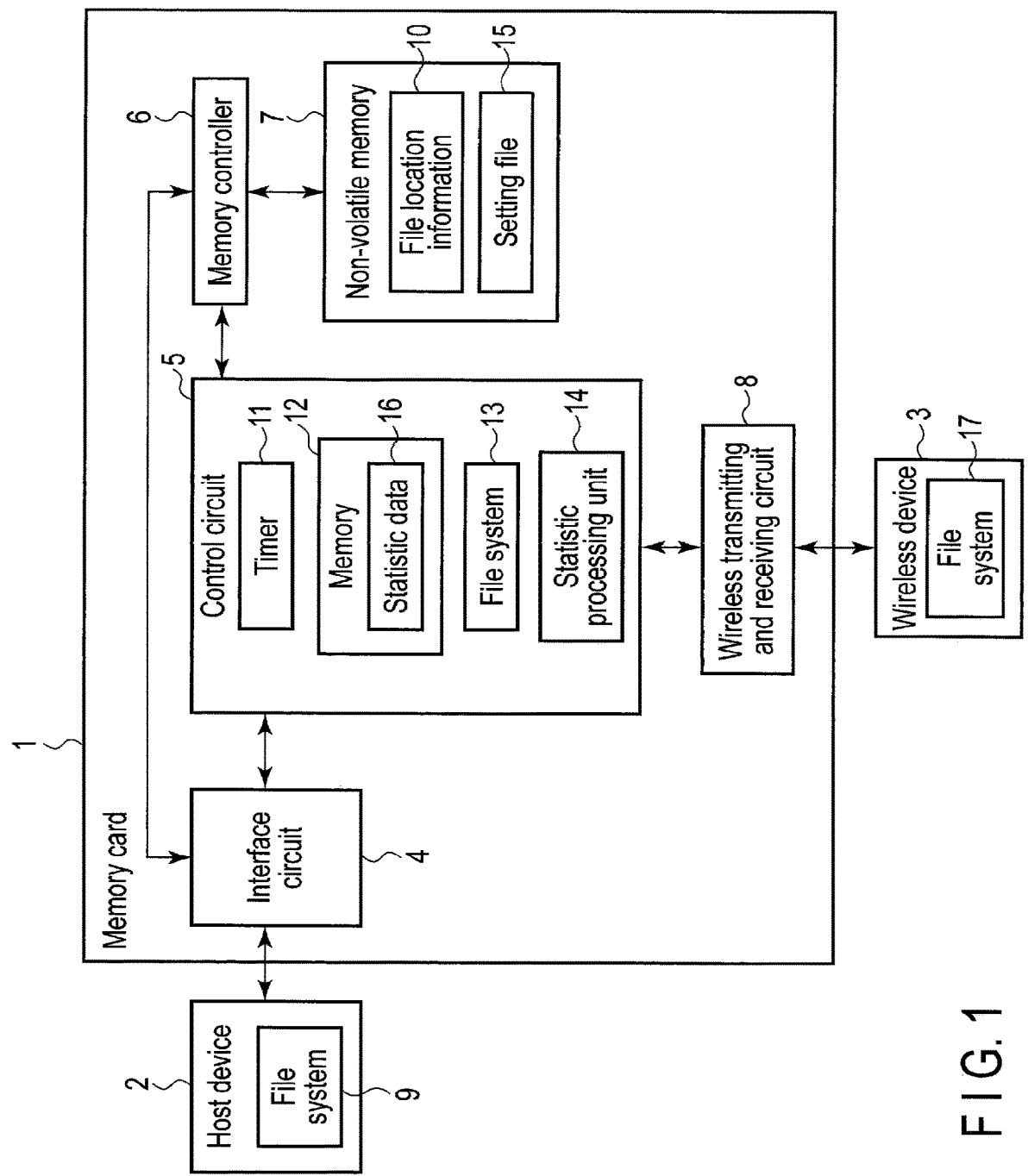
F I G. 1

| Reception start time | Reception end time | Data amount |
|---|---|---|
| ⋮ | ⋮ | ⋮ |

FIG. 2

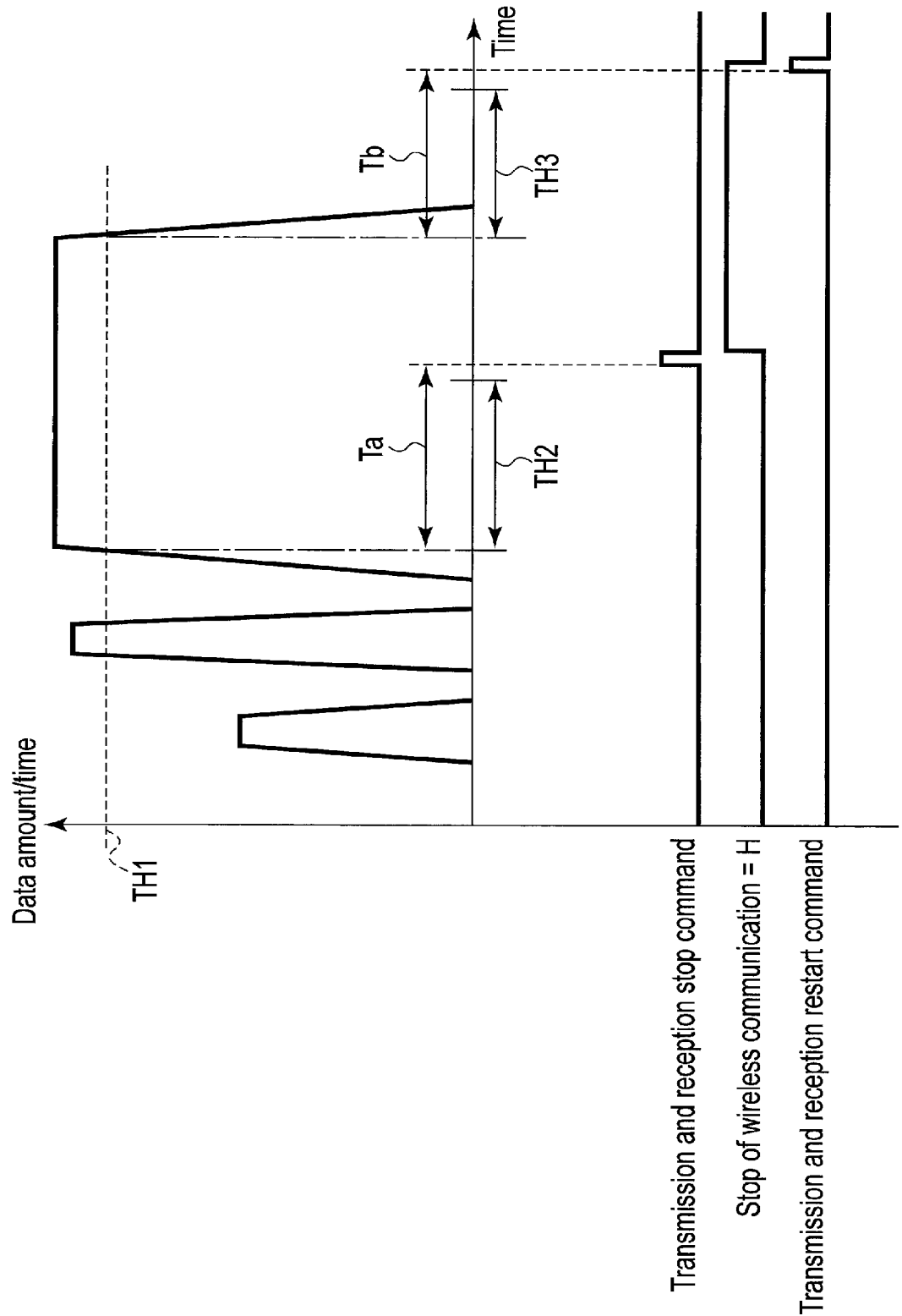
F I G. 6

WIRELESS COMMUNICATION ENABLED STORAGE DEVICE AND CONTROL METHOD THEREFOR

CROSS-REFERENCE TO RELATED APPLICATIONS

This application is based upon and claims the benefit of priority from Japanese Patent Application No. 2019-034709, filed Feb. 27, 2019, the entire contents of which are incorporated herein by reference.

FIELD

An embodiment described herein relates generally to a storage device and a control method therefor.

BACKGROUND

A memory card including a wireless local area network (LAN) function has been used.

BRIEF DESCRIPTION OF THE DRAWINGS

FIG. 1 is a block diagram illustrating an example of a configuration of a memory card including a wireless communication function according to an embodiment.

FIG. 2 is a data structure diagram illustrating an example of statistical data in the embodiment.

FIG. 6 is a graph illustrates a concrete example of determination processing of stopping the wireless communication performed by the memory card including the wireless communication function according to the embodiment.

DETAILED DESCRIPTION

Figure 3:
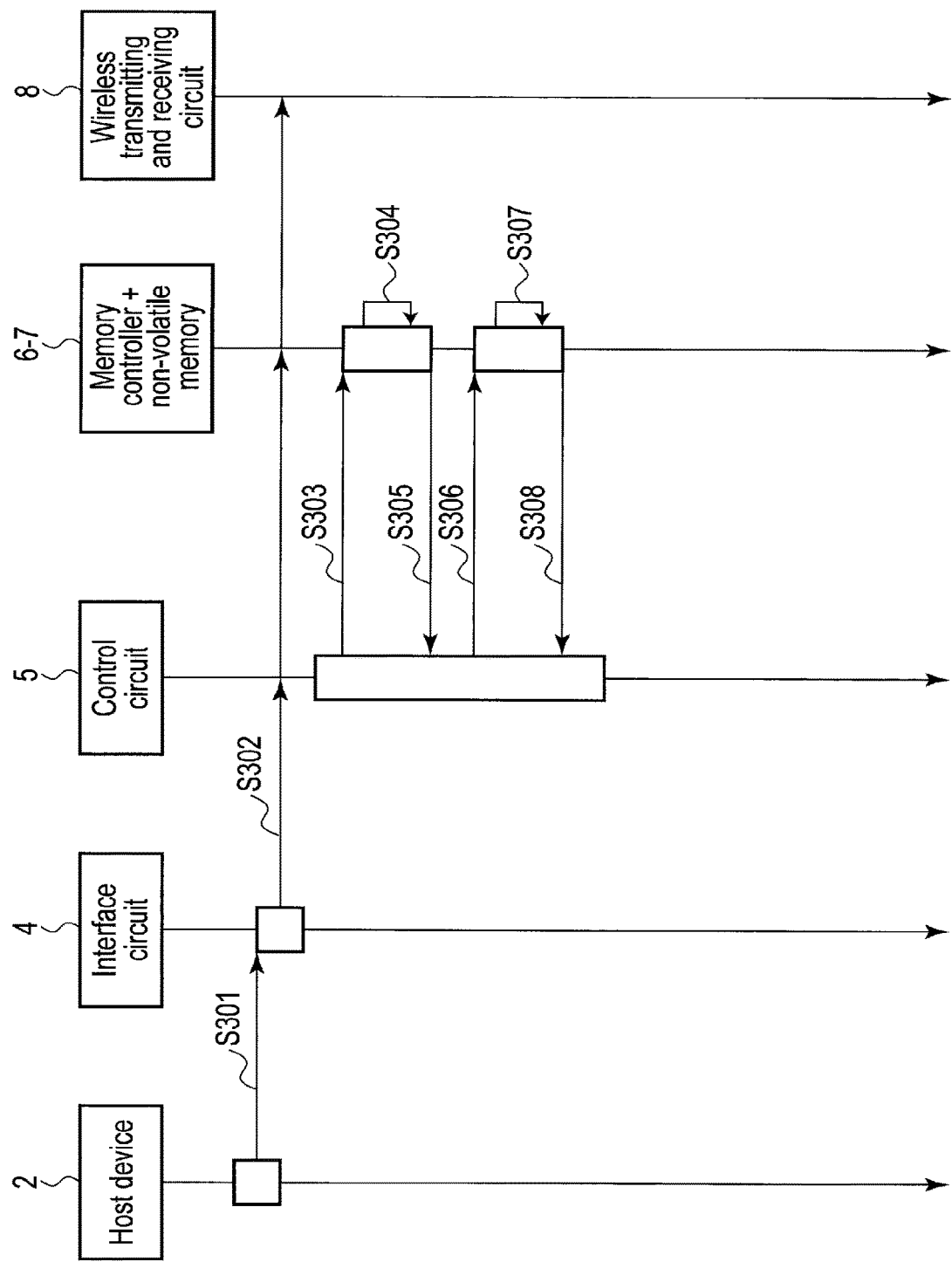
FIG. 3 is a sequence diagram illustrating an example of processing performed by the memory card including the wireless communication function according to the embodiment when power starts to be supplied.

An embodiment will be described hereinafter with reference to the accompanying drawings. In the following description, constituent elements having substantially the same function and configuration will be denoted by the same reference number, and description will be repeated only when necessary. Further, the following embodiment illustrates a device and a method which give concrete forms to technical ideas, and the technical ideas of the embodiment are not intended to limit materials, shapes, structures, arrangements, etc., of components to those descried below. The technical ideas of the embodiment can be modified in various manners in the scope of patent claims.

In general, according to one embodiment, a storage device includes a non-volatile memory, an interface circuit, a first control circuit, a wireless transmitting and receiving circuit, and a second control circuit. The interface circuit is electrically connected to the host device and is capable of communicating the host device. The first control circuit performs control of writing write data received from the host device via the interface circuit into the non-volatile memory. The wireless transmitting and receiving circuit is capable of wirelessly communicating with a wireless device. The second control circuit determines whether or not the write data include a predetermined type of data based on measurement data associated with the write data, and stops wireless communication performed by the wireless transmitting and receiving circuit in a case where it is determined that the write data include the predetermined type of data.

In the present embodiment, the storage device which suppresses noise from being mixed into data received from a host device in a case where the data are written into a non-volatile memory while wireless communication is in progress, and a control method therefor will be described.

In the present embodiment, a case where the storage device is a memory card will be described by way of example. However, the same configuration and function can be applied to various types of storage devices (for example, a memory system) such as a hard disk drive, a universal serial bus (USB) memory, a solid state drive (SSD), or the like. The memory card may be a secure digital (SD) memory card (registered trademark) or may be a memory card conforming to another standard.

Further, in the present embodiment, as the wireless communication, wireless local area network (LAN) communication will be described by way of example. However, the configuration and functions according to the present embodiment may also be applied to other wireless communication such as communication using Bluetooth (registered trademark), short-range wireless communication, or the like, instead of the wireless LAN communication.

Further, in the present embodiment, a case where the storage device attempts to detect recorded data including moving image data and audio data associated with the moving image data will be described by way of example. However, a predetermined type of data that the storage device attempts to detect is data of which noise mixed during the write data are written into a non-volatile memory while the wireless communication is in progress is required to be suppressed. For example, the predetermined type of data is data including at least audio data. Examples of the predetermined type of data may include audio data, moving image data, still image data, text data, data including still image data and audio data associated with the still image data, and the like. It should be noted that the recorded data can also be referred to as, for example, moving image data with audio data. Here, it is assumed that the noise is generated in the host device and mixed into audio data.

FIG. 1 is a block diagram illustrating an example of a configuration of a memory card 1 including a wireless communication function according to the present embodiment. The memory card 1 including the wireless communication function stops wireless communication and gives priority to perform writing of write data received from a host device 2 over performing the wireless communication, in a case where the write data include the predetermined type of data.

The memory card 1 is communicably connected to the host device 2. Further, the memory card 1 can perform the wireless communication with a wireless device 3.

The memory card 1 includes an interface circuit 4, a control circuit 5, a memory controller 6, a non-volatile memory 7, and a wireless transmitting and receiving circuit 8.

Here, at least two of the interface circuit 4, the control circuit 5, the memory controller 6, and the wireless transmitting and receiving circuit 8 included in the memory card 1 may be implemented by a chip or may be formed in a form of a system-on-a-chip (SoC). In the present embodiment, the interface circuit 4, the control circuit 5, the memory controller 6, and the wireless transmitting and receiving circuit 8 can be freely combined. For example, the control circuit 5 and the memory controller 6 may be combined as a control circuit, and the control circuit may perform control of writing write data received from the host device 2 via the interface circuit 4 into the non-volatile memory 7, and perform control of enabling or disabling the wireless communication performed by the wireless transmitting and receiving circuit 8 in accordance with a data amount of the write data and a time required for receiving the write data. Various functions of the control circuit 4 may be implemented by executing, by a processor, software (for example, firmware) stored in a memory such as a read only memory (ROM) or an erasable programmable read only memory (EPROM).

The host device 2 supplies power to the memory card 1 when the host device 2 is electrically connected to the memory card 1.

Examples of the host device 2 include an information processing device, a digital camera, an audio device, a microphone, and the like. The digital camera is, for example, a camera with a microphone and collects recorded data. The memory card 1 is used as, for example, an auxiliary storage device of the host device 2.

The host device 2 includes, for example, a file system 9. The file system 9 manages a file stored in the memory card 1 as a datum, allows a file to be identified by a file name, and allows a file to be handled using a tree structure. File location information 10 is stored at, for example, a predetermined location (or region) in the non-volatile memory 7. Generating and updating of the file location information 10 and storing of the file location information 10 into the non-volatile memory 7 are performed based on, for example, control by the file system 9 of the host device 2. The file location information 10 includes, for example, information indicating the location of the file in the non-volatile memory 7 and a file name. In more detail, the file location information 10 includes a tree structure of directories or folders, identification information of a file belonging to the directory, and the like. The file system 9 of the host device 2 writes the file location information 10 into the non-volatile memory 7 via the interface circuit 4 and the memory controller 6. Further, the file system 9 reads the file location information 10 stored at the predetermined location in the non-volatile memory 7 via the memory controller 6 and the interface circuit 4. The file system 9 can identify a file stored in the non-volatile memory 7, a file path indicating a relation between files, and a location of a file based on the read file location information 10.

The host device 2 transmits, to the memory card 1, a write command, write data to be stored in the memory card 1, and an address (for example, a block address) of the write data.

The host device 2 transmits a read command and an address to the memory card 1 and receives read data corresponding to the address from the memory card 1.

A command, data, an address, a response corresponding to the command, and the like are transmitted and received between the interface circuit 4 and the host device 2 in complying with a predetermined standard.

The interface circuit 4 is electrically connected to the host device 2 and is communicable with the host device 2. In response to receiving power from the host device 2, the interface circuit 4 supplies the power to respective components of the memory card 1, specifically, to the control circuit 5, the memory controller 6, the non-volatile memory 7, the wireless transmitting and receiving circuit 8, and the like.

The control circuit 5 performs setting for transmitting data to the non-volatile memory 7 with respect to the interface circuit 4.

In response to receiving a write command from the host device 2, the interface circuit 4 transmits, to the memory controller 6, the write command and the write data and the address received from the host device 2. The interface circuit 4 may transmit, to the memory controller 6 via the control circuit 5, the write command and the write data and the address received from the host device 2.

In response to receiving a read command from the host device 2, the interface circuit 4 transmits, to the memory controller 6, the read command and the address received from the host device 2. Further, the interface circuit 4 receives the read data corresponding to the address from the memory controller 6 and transmits the read data to the host device 2. It should be noted that the interface circuit 4 may transmit, to the memory controller 6 via the control circuit 5, the read command and the address received from the host device 2. Further, the interface circuit 4 may receive the read data corresponding to the address from the memory controller 6 via the control circuit 5 and transmit the read data to the host device 2.

The wireless device 3 wirelessly transmits, to the memory card 1, a write command, write data to be stored in the memory card 1, and an address of the write data.

For example, the wireless device 3 may include a file system 17 similarly to the host device 2 described above. The file system 17 of the wireless device 3 reads, for example, the file location information 10 stored at the predetermined location in the non-volatile memory 7 via the memory controller 6, the control circuit 5, and the wireless transmitting and receiving circuit 8. The file system 17 can identify a file stored in the non-volatile memory 7, a file path indicating a relation between files, and a location of a file by reading the file location information 10.

It should be noted that the wireless device 3 may also be able to identify a file stored in the non-volatile memory 7, a file path indicating a relation between files, and a location of a file by using a file system 13 of the control circuit 5, in a case where the wireless device 3 does not include the file system 17.

The wireless device 3 wirelessly transmits a read command and an address to the memory card 1 and wirelessly receives read data corresponding to the address from the memory card 1.

A command, data, an address, a response corresponding to the command, and the like are transmitted and received between the wireless transmitting and receiving circuit 8 and the wireless device 3 in complying with a predetermined standard. The wireless transmitting and receiving circuit 8 stops the wireless communication in accordance with a transmission and reception stop command received from the control circuit 5, and restarts the wireless communication in accordance with a transmission and reception restart command received from the control circuit 5.

The control circuit 5 performs communication control of controlling the wireless transmitting and receiving circuit 8. The communication control of the control circuit 5 includes, for example, transmission of the transmission and reception stop command and the transmission and reception restart command to the wireless transmitting and receiving circuit 8.

For example, in response to receiving the write command from the wireless device 3 via the wireless transmitting and receiving circuit 8, the control circuit 5 transmits, to the memory controller 6, the write command and the write data and the address received from the wireless device 3 via the wireless transmitting and receiving circuit 8.

For example, in response to receiving the read command from the wireless device 3 via the wireless transmitting and receiving circuit 8, the control circuit 5 transmits, to the memory controller 6, the read command and the address received from the wireless device 3 via the wireless transmitting and receiving circuit 8. Further, the control circuit 5 receives the read data corresponding to the address from the memory controller 6 and transmits the read data to the wireless device 3 via the wireless transmitting and receiving circuit 8.

In addition, the control circuit 5 may transmit, to the wireless device 3 via the wireless transmitting and receiving circuit 8 through the wireless communication, the data or command received from the host device 2 via the interface circuit 4.

Further, the control circuit 5 may transmit, to the host device 2 via the interface circuit 4, the data or command received from the wireless device 3 via the wireless transmitting and receiving circuit 8 through the wireless communication.

The control circuit 5 performs control of enabling or disabling the wireless communication performed by the wireless transmitting and receiving circuit 8 in accordance with a data amount of the write data received by the interface circuit 4 and a time required for receiving the write data. In order to perform the control, the control circuit 5 includes a timer 11, a non-volatile memory 12, the file system 13, and a statistical processing unit 14. As described above, at least one of the timer 11, the file system 13, and the statistical processing unit 14 included in the control circuit 5 may be implemented by executing, by a processor in the control circuit 5, software (for example, firmware) stored in the memory 12 or the like, or may be implemented by hardware (for example, an electronic circuit).

The timer 11 generates time information. In more detail, the timer 11 may measure, for example, a reception start time and a reception end time of each piece of the write data, or may measure an elapsed time from when the write command is received to when the reception of each piece of the write data ends.

The memory 12 is a non-volatile memory, and, for example, EPROM is used as the memory 12.

The file system 13 identifies a file written in the non-volatile memory 7 and a file path based on the file location information 10 read from the non-volatile memory 7 via the memory controller 6, and identifies a location of a setting file 15 written in the non-volatile memory 7.

The control circuit 5 generates measurement data associated with the write data, and stores the generated measurement data in the memory 12.

In the present embodiment, the measurement data are, for example, statistical data 16 usable for statistical processing.

The statistical data 16 includes, for example, data in which a data amount of the write data is associated with time information associated with the write data, the write data being received by the interface circuit 4 from the host device 2 and to be written by the memory controller 6 into the non-volatile memory 7. The statistical data 16 will be described later with reference to FIG. 2.

The control circuit 5 reads the setting file 15 from the non-volatile memory 7 via the memory controller 6 based on the file location information 10.

The setting file 15 includes, for example, a condition, a threshold value, a parameter, and the like used for determination for stopping the wireless communication performed by the wireless transmitting and receiving circuit 8. The setting file 15 includes, for example, a threshold value, a parameter, and the like used to determine whether or not the write data received by the memory card 1 from the host device 2 and to be written into the non-volatile memory 7 are recorded data (that is, the predetermined type of data) based on the statistical data 16. In more detail, the setting file 15 includes, for example, a first threshold value compared with a data amount of the received write data per unit time, a second threshold value compared with a reception time of the write data of which the data amount per unit time exceeds the first threshold value, and a third threshold value compared with a reception time of new write data of which a data amount of the new write data per unit time is equal to or less than the first threshold value after the wireless communication is stopped. The first to third threshold values will be described later with reference to FIG. 6. The setting file 15 may be already written in the non-volatile memory 7 by default at the time of releasing the memory card 1, or the setting file 15 received from the host device 2 or the wireless device 3 may be written into the non-volatile memory 7.

For example, in a case where the wireless communication performed by the wireless transmitting and receiving circuit 8 is in progress, and a write operation in which the interface circuit 4 receives the write data from the host device 2 and the memory controller 6 writes the write data into the non-volatile memory 7 starts, the control circuit 5 instructs the statistical processing unit 14 to perform the statistical processing based on the setting file 15 and the statistical data 16 of the memory 12.

The statistical processing unit 14 performs determination processing of determining whether or not the write data are recorded data based on the setting file 15 and the statistical data 16, and returns a determination result to the control circuit 5. In detail, the statistical processing unit 14 calculates, for example, a data amount (for example, may also be referred to as a stored data amount or an amount of data to be stored) of the write data, which are received by the interface circuit 4 from the host device 2 and to be written by the memory controller 6 into the non-volatile memory 7, per unit time. Further the statistical processing unit 14 determines that the write data are recorded data in a case where a time, for which a stored data amount continuously exceeds the first threshold value, exceeds the second threshold value. In addition, the statistical processing unit 14 determines that new write data are not recorded data in a case where a time, for which a stored data amount of the new write data is continuously equal to or less than the first threshold value, exceeds the third threshold value after it is determined that the write data are recorded data. The determination processing will be described later with reference to FIG. 6.

The control circuit 5 transmits the transmission and reception stop command to the wireless transmitting and receiving circuit 8 in a case where a determination result obtained by the statistical processing unit 14 indicates that the write data are recorded data. As a result, the wireless transmitting and receiving circuit 8 stops the wireless communication. In addition, the control circuit 5 transmits the transmission and reception restart command to the wireless transmitting and receiving circuit 8 in a case where a determination result obtained by the statistical processing unit 14 indicates that the new write data are not recorded data after the wireless transmitting and receiving circuit 8 stops the wireless communication. As a result, the wireless transmitting and receiving circuit 8 restarts the wireless communication.

In response to receiving the write command from the interface circuit 4 or the control circuit 5, the memory controller 6 receives the address and the write data from the interface circuit 4 or the control circuit 5, translates the received address into a physical address, and writes the write data into the non-volatile memory 7 based on the physical address.

Further, in response to receiving the read command from the interface circuit 4 or the control circuit 5, the memory controller 6 translates the address received from the interface circuit 4 or the control circuit 5 into a physical address, reads the read data from the non-volatile memory 7 based on the physical address, and returns the read data to the interface circuit 4 or the control circuit 5.

The processing of translating the received address into the physical address is implemented not by the memory controller 6 but by the control circuit 5.

The non-volatile memory 7 stores the file location information 10 and the setting file 15 as described above. Examples of the non-volatile memory 7 may include an NAND-type flash memory, other non-volatile semiconductor memories such as an NOR-type flash memory, a magnetoresistive random access memory (MRAM), a phase-change random access memory (PRAM), a resistive random access memory (ReRAM), a ferroelectric random access memory (FeRAM), and the like. For example, the non-volatile memory 7 may also be another non-volatile memory, a magnetic memory, or the like. For example, the non-volatile memory 7 may also be a semiconductor memory having a three-dimensional structure.

The wireless transmitting and receiving circuit 8 performs the wireless communication with the wireless device 3 in accordance with control by the control circuit 5. The wireless transmitting and receiving circuit 8 stops the wireless communication in accordance with the transmission and reception stop command from the control circuit 5. Here, the stop of the wireless communication may be realized, for example, in a manner in which the wireless transmitting and receiving circuit 8 blocks a transmission request and a retransmission request from the wireless device 3 so that the wireless communication between the wireless transmitting and receiving circuit 8 and the wireless device 3 is timed out, in a manner in which the wireless transmitting and receiving circuit 8 stops transmission and reception of a wireless signal, or in a manner in which the wireless transmitting and receiving circuit 8 stops a circuit operation.

In addition, the wireless transmitting and receiving circuit 8 can restart the wireless communication between the wireless transmitting and receiving circuit 8 and the wireless device 3 in accordance with the transmission and reception restart command from the control circuit 5. Here, the restart of the wireless communication may be realized, for example, in a manner in which the blocking of the transmission request and the retransmission request from the wireless device 3 is released, in a manner in which the wireless transmitting and receiving circuit 8 restarts transmission and reception of a wireless signal, or in a manner in which the wireless transmitting and receiving circuit 8 restarts the circuit operation.

In the memory card 1 of FIG. 1, the statistical processing unit 14 calculates the stored data amount based on the statistical data 16. However, the control circuit 5, instead of the statistical processing unit 14, may calculate the stored data amount and store the statistical data 16 including the stored data amount in the memory 12, and the statistical processing unit 14 may read the statistical data 16 including the stored data amount from the memory 12. In this case, the statistical processing unit 14 transmits a result indicating that recorded data is detected to the control circuit 5 in a case of detecting a fact that a stored data amount included in the read statistical data 16 exceeds the first threshold value and a time, for which the stored data amount continuously exceeds the first threshold value, exceeds the second threshold value, or a timing at which the time, for which the stored data amount continuously exceeds the first threshold value, exceeds the second threshold value. In addition, the statistical processing unit 14 transmits a result indicating that recorded data is not detected to the control circuit 5 in a case of detecting a fact that a time, for which a stored data amount included in the read statistical data 16 is continuously equal to or less than the first threshold value, exceeds the third threshold value, or a timing at which the time for which, the stored data amount is continuously equal to or less than the first threshold value, exceeds the third threshold value.

FIG. 2 is a data structure diagram illustrating an example of the statistical data 16 in the present embodiment.

In the example in FIG. 2, the statistical data 16 includes a reception start time, a reception end time, and a data amount of each of the write data received from the host device 2. The reception start time and the reception end time are measured by the timer 11.

It should be noted that the statistical data 16 may also include, for example, an elapsed time from when a write command is received to when a reception of each of the write data ends, instead of the reception start time and the reception end time. The elapsed time is measured by the timer 11.

FIG. 3 is a sequence diagram illustrating an example of processing performed by the memory card 1 according to the present embodiment when power starts to be supplied. In FIG. 3, for convenience of explanation, the memory controller 6 and the non-volatile memory 7 are collectively illustrated as a block 6-7.

In S301, the host device 2 supplies power to the interface circuit 4 of the memory card 1.

In S302, the interface circuit 4 supplies power to, for example, the control circuit 5, the memory controller 6, the non-volatile memory 7, and the wireless transmitting and receiving circuit 8.

In S303, when the power starts to be supplied, the control circuit 5 transmits, to the memory controller 6, a read command for the file location information 10 written to the predetermined location in the non-volatile memory 7.

In S304, the memory controller 6 reads the file location information 10 from the non-volatile memory 7.

In S305, the memory controller 6 transmits the file location information 10 to the control circuit 5.

In S306, the control circuit 5 identifies a location of the setting file 15 based on the file location information 10 received from the memory controller 6, and transmits a read command for the setting file 15 to the memory controller 6.

In S307, the memory controller 6 reads the setting file 15 from the non-volatile memory 7.

In S308, the memory controller 6 transmits the setting file 15 to the control circuit 5.

As a result, the control circuit 5 can acquire the setting file 15.

Figure 4:
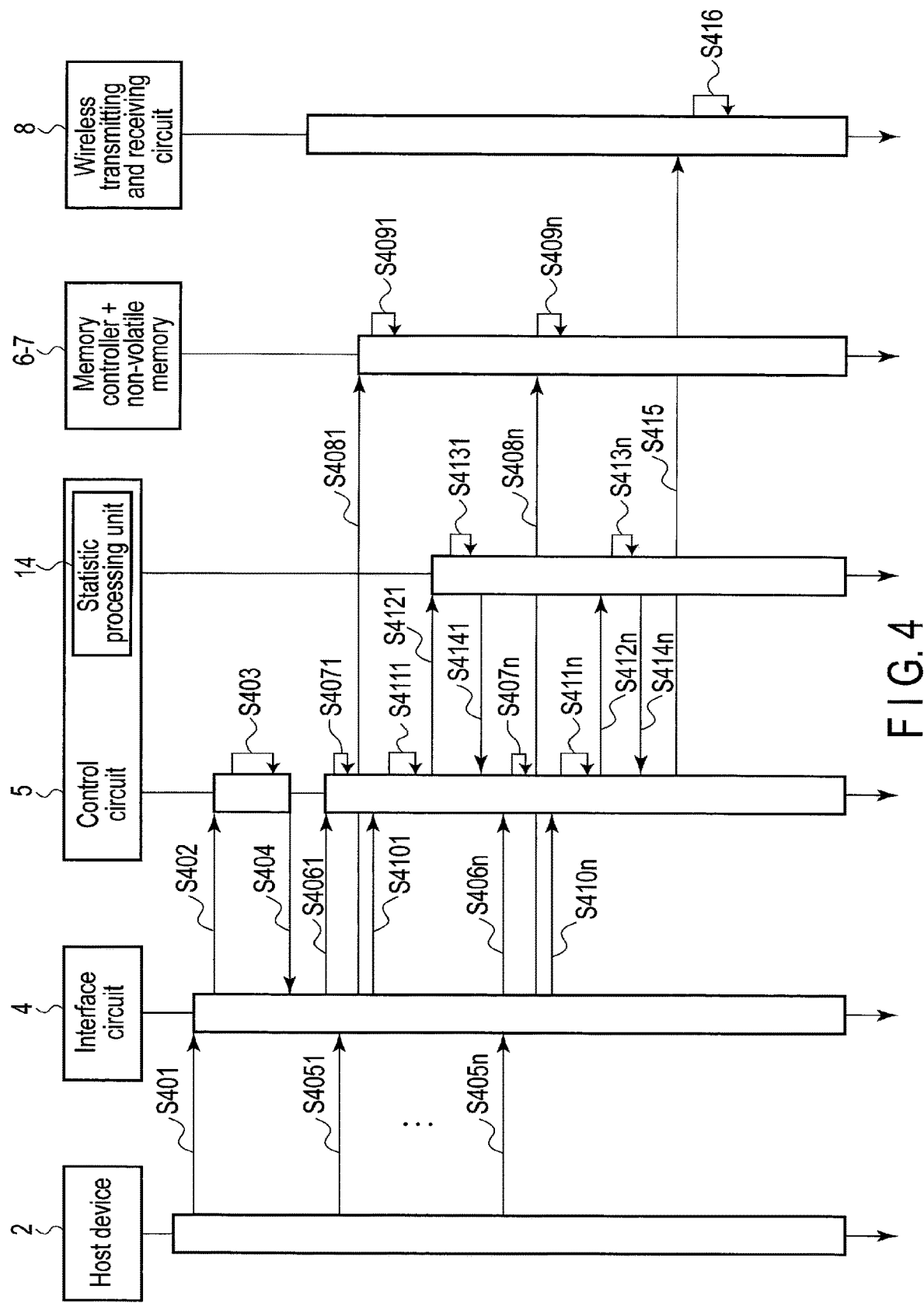
FIG. 4 is a sequence diagram illustrating an example of processing of stopping wireless communication performed by the memory card including the wireless communication function according to the embodiment.

FIG. 4 is a sequence diagram illustrating an example of processing of stopping the wireless communication performed by the memory card 1 according to the present embodiment.

In FIG. 4, it is assumed that the data transmitted and received between the host device 2 and the memory card 1 is defined as being, for example, equal to or less than a predetermined size in accordance with a standard. For this reason, for example, in a case where the write data are recorded data and is larger than the predetermined size, the write data are divided into a plurality of pieces and transmitted from the host device 2 to the memory card 1.

In S401, the interface circuit 4 receives the write command from the host device 2.

In S402, the interface circuit 4 transmits the write command to the control circuit 5.

In S403, in response to the write command is received from the interface circuit 4, the control circuit 5 may set a reception time of the write command measured by the timer 11 and identification information of the write command for the statistical data 16 of the memory 12. It should be noted that S403 may be omitted.

In S404, the control circuit 5 performs setting for writing by the interface circuit 4 into the non-volatile memory 7 via the memory controller 6 with respect to the interface circuit 4.

In S4051 to S405$n$, the interface circuit 4 receives the write data and the address from the host device 2 multiple times (n times in the example in FIG. 4).

In S4061 to S406$n$, the interface circuit 4 notifies the control circuit 5 of the reception of each of write data in a case of receiving each of write data from the host device 2.

In S4071 to S407$n$, the control circuit 5 sets the reception start time measured by the timer 11 for the statistical data 16 in a case of receiving the notification regarding the reception of each of write data.

In S4081 to S408$n$, the interface circuit 4 transmits each of write data and each address to the memory controller 6.

In S4091 to S409$n$, the memory controller 6 performs an address translation with respect to each address, and writes each of write data into the non-volatile memory 7 based on each address obtained by the translation.

In S4101 to S410$n$, the interface circuit 4 notifies the control circuit 5 of the data amount (for example, a data size) of each piece of write data at a write end timing of each of write data.

In S4111 to S411$n$, in response to the data amount of each of write data is received from the interface circuit 4, the control circuit 5 sets each received data amount and a reception end time measured by the timer 11 for the statistical data 16 of the memory 12. As a result, the statistical data 16 including the reception start time and the reception end time of each of write data measured by the timer 11, and the data amount of each of write data are stored in the memory 12.

In S4121 to S412$n$, the control circuit 5 instructs the statistical processing unit 14 to perform the statistical processing based on the statistical data 16 and the first and second threshold values included in the statistical data 16.

In S4131 to S413$n$, the statistical processing unit 14 determines whether or not the time, for which the stored data amount continuously exceeds the first threshold value, exceeds the second threshold value based on the statistical data 16 and the first and second threshold values.

In S4141 to S414$n$, the statistical processing unit 14 returns a determination result to the control circuit 5. In FIG. 4, a case where a determination result returned by the statistical processing unit 14 to the control circuit 5 in S414$n$ indicates that the time, for which the stored data amount continuously exceeds the first threshold value, exceeds the second threshold value, is illustrated.

In S415, the control circuit 5 transmits the transmission and reception stop command to the wireless transmitting and receiving circuit 8 in a case of receiving the determination result indicating that the time, for which the stored data amount continuously exceeds the first threshold value, exceeds the second threshold value from the statistical processing unit 14.

In S416, the wireless transmitting and receiving circuit 8 stops the wireless communication in response to the reception of the transmission and reception stop command from the control circuit 5.

As described above, in FIG. 4, S4051 to S405$n$ are illustrated as transmission of the write data from the host device 2 to the interface circuit 4. However, although not illustrated in FIG. 4, the write data may be continuously transmitted from the host device 2 to the interface circuit 4 even after S405$n$.

Figure 5:
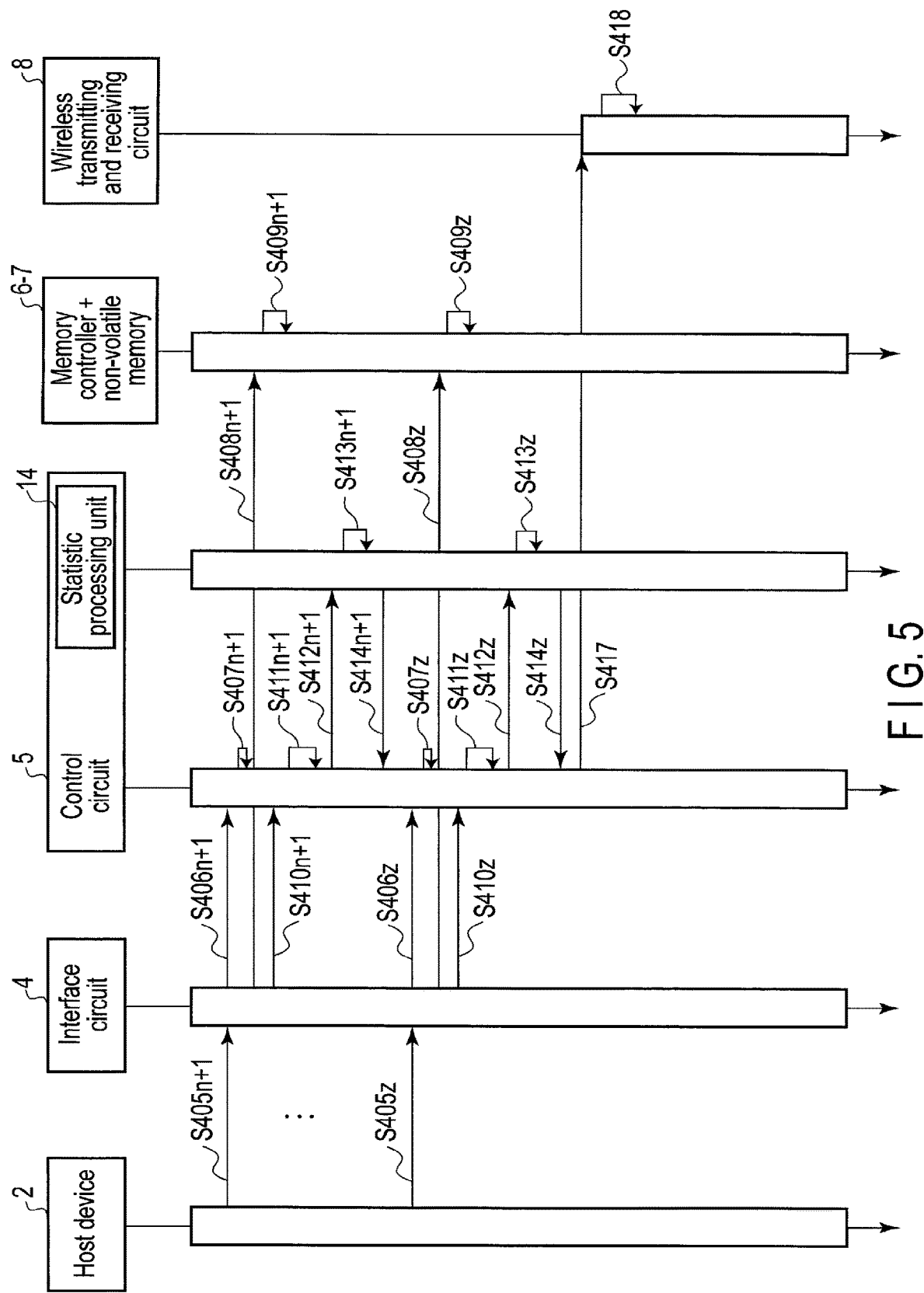
FIG. 5 is a sequence diagram illustrating an example of processing of restarting wireless communication performed by the memory card including the wireless communication function according to the embodiment.

FIG. 5 is a sequence diagram illustrating an example of processing of restarting the wireless communication performed by the memory card 1 according to the present embodiment. In FIG. 5, a state in which the write data are continuously transmitted from the host device 2 to the interface circuit 4 even after S405$n$ in FIG. 4 described above.

In S405$n$+1 to S405$z$, the interface circuit 4 receives the write data and the address from the host device 2 multiple times (z-n times in the example in FIG. 5).

In S406$n$+1 to S406$z$, the interface circuit 4 notifies the control circuit 5 of the reception of each of write data in a case of receiving each of write data from the host device 2.

In S407$n$+1 to S407$z$, the control circuit 5 sets the reception start time measured by the timer 11 for the statistical data 16 in a case of receiving the notification regarding the reception of each of write data.

In S408$n$+1 to S408$z$, the interface circuit 4 transmits each of write data and each address to the memory controller 6.

In S409$n$+1 to S409$z$, the memory controller 6 performs an address translation with respect to each address, and writes each of write data into the non-volatile memory 7 based on each address obtained by the translation.

In S410$n$+1 to S410$z$, the interface circuit 4 notifies the control circuit 5 of the data amount of each of write data at a write end timing of each of write data.

In S411$n$+1 to S411$z$, in response to the data amount of each of write data is received from the interface circuit 4, the control circuit 5 sets each received data amount and a reception end time measured by the timer 11 for the statistical data 16 of the memory 12.

In S412$n$+1 to S412$z$, the control circuit 5 instructs the statistical processing unit 14 to perform the statistical processing based on the statistical data 16 and the first and third threshold values included in the setting file 15.

In S413$n$+1 to S413$z$, the statistical processing unit 14 determines whether or not the time, for which the stored data amount is continuously equal to or less than the first threshold value, exceeds the third threshold value after the transmission of the transmission and reception stop command, based on the statistical data 16 and the first and third threshold values.

In S414$n$+1 to S414$z$, the statistical processing unit 14 returns a determination result to the control circuit 5. In FIG. 5, a case where a determination result returned by the statistical processing unit 14 to the control circuit 5 in S414$z$ indicates that the time, for which the stored data amount is continuously equal to or less than the first threshold value, exceeds the third threshold value, is illustrated.

In S417, the control circuit 5 transmits the transmission and reception restart command to the wireless transmitting and receiving circuit 8 in a case of receiving the determination result indicating that the time, for which the stored data amount is continuously equal to or less than the first threshold value, exceeds the third threshold value from the statistical processing unit 14.

In S418, the wireless transmitting and receiving circuit 8 releases a wireless communication stopping state, and becomes a wireless communication enabling state again in response to the reception of the transmission and reception restart command from the control circuit 5, thereby enabling the wireless communication again.

FIG. 6 is a graph illustrating a concrete example of determining processing of stopping the wireless communication performed by the memory card 1 according to the present embodiment.

In FIG. 6, a vertical axis represents a data amount of the write data per unit time, that is, a stored data amount, the write data being received by the interface circuit 4 from the host device 2 and to be written by the memory controller 6 into the non-volatile memory 7. A horizontal axis represents time.

FIG. 6 further illustrates a transmission timing of the transmission and reception stop command, a period for which the wireless communication is stopped, and a transmission timing of the transmission and reception restart command.

The statistical processing unit 14 calculates a stored data amount, and determines whether or not the stored data amount exceeds a first threshold value TH1.

Further, the statistical processing unit 14 determines whether or not a time Ta for which the stored data amount continuously exceeds the first threshold value TH1 exceeds a second threshold value TH2. In other words, the time Ta is a duration of a state in which the stored data amount exceeds the first threshold value TH1. In a case where the stored data amount becomes equal to or less than the first threshold value TH1 after the stored data amount exceeds the first threshold value TH1, the time Ta is reset.

Further, the statistical processing unit 14 determines whether or not a time Tb for which the stored data amount is continuously equal to or less than the first threshold value TH1 exceeds a third threshold value TH3 after the time Ta exceeds the second threshold value TH2 or the transmission and reception stop command is transmitted. In a case where the stored data amount exceeds the first threshold value TH1 after the stored data amount becomes equal to or less than the first threshold value TH1, the time Tb is reset.

The control circuit 5 transmits the transmission and reception stop command to the wireless transmitting and receiving circuit 8 in accordance with a determination result indicating that the write data are recorded data in a case where the time Ta exceeds the second threshold value TH2.

The control circuit 5 transmits the transmission and reception restart command to the wireless transmitting and receiving circuit 8 in a case where the time Tb exceeds the third threshold value TH3 after the transmission of the transmission and reception stop command.

The wireless transmitting and receiving circuit 6 stops the wireless communication from when the transmission and reception stop command is received to when the transmission and reception restart command is received.

Hereinafter, effects of the memory card 1 described above will be described.

A memory card with a wireless communication function, which does not have functions of the control circuit 5 and the statistical processing unit 14 described in the present embodiment, will hereinafter be referred to as a memory card of Comparative Example. When the memory card of Comparative Example writes recorded data received from the host device 2 while the memory card of Comparative Example performs the wireless communication by using the wireless communication function, noise (for example, pop noise) may be mainly mixed into audio data among recorded data written in the memory card of Comparative Example.

It is considered that the mixing of the noise is caused by an influence of a wireless signal sent from the wireless transmitting and receiving circuit 8 on a microphone of the host device 2, and a decrease in power supply voltage of the memory card of Comparative Example due to current consumption for an operation of the wireless transmitting and receiving circuit 8.

Further, it is difficult for the memory card of Comparative Example to determine to which data in the file system the data stored in the memory card from the host device 2 corresponds.

However, in the present embodiment, the memory card 1 includes the statistical processing unit 14, and the statistical processing unit 14 calculates the stored data amount. Further, the statistical processing unit 14 detects a timing at which the time Ta for which the stored data amount exceeds the first threshold value TH1 exceeds the second threshold value TH2. The control circuit 5 stops the wireless communication of the wireless transmitting and receiving circuit 8 in accordance with the detection of the timing.

By doing so, it is possible to prevent the wireless communication from being performed at the time of writing the recorded data, prevent the wireless signal from adversely affecting the microphone of the host device 2, and prevent the power supply voltage from instantaneously being decreased due to the wireless communication of the memory card 1. As a result, in the present embodiment, it is possible to suppress noise from being mixed into the recorded data to be written in the non-volatile memory 7.

Further, in the present embodiment, the statistical processing unit 14 detects a timing at which the time Tb for which the stored data amount is continuously equal to or less than the first threshold value TH1 exceeds the third threshold value TH3 after the wireless communication is stopped. The control circuit 5 restarts the wireless communication of the wireless transmitting and receiving circuit 8 in accordance with the detection of the timing.

By doing so, even when the wireless communication is stopped, the wireless communication can restart appropriately and rapidly.

In the present embodiment, the control circuit 5 stops the wireless communication performed by the wireless transmitting and receiving circuit 8 during the writing of the recorded data. However, instead, the control circuit 5 may perform, for example, control of suppressing power consumption by the wireless transmitting and receiving circuit 8 for generating a wireless signal during the writing of the recorded data. Examples of a specific method of suppressing the power consumption by the wireless transmitting and receiving circuit 8 include a method of stopping supplying of power to the wireless transmitting and receiving circuit 8, a method of decreasing a voltage applied to the wireless transmitting and receiving circuit 8, or a method of decreasing a current supplied to the wireless transmitting and receiving circuit 8. Further, the restart of the wireless communication can be realized by returning a state changed by processing of stopping the wireless communication to a state before the change.

In the present embodiment, the interface circuit 4, the wireless transmitting and receiving circuit 8, the timer 11 of the control circuit 5, the memory 12 of the control circuit 5, the statistical processing unit 14 of the control circuit 5, the memory controller 6, and the non-volatile memory 7 each can be implemented by an electronic circuit.

In the present embodiment, a configuration in which the statistical processing unit 14 is included in the control circuit 5 has been described by way of example. However, the statistical processing unit 14 may also be a component independent of the control circuit 5.

A portion of the control circuit 5 which controls the stop and the restart of the wireless communication can be implemented by an electronic circuit, and may also be implemented by executing, by a processor, software.

In the present embodiment, whether or not the write data are recorded data based on a characteristic of a data amount of the write data per unit time. However, the recorded data may be detected by another data analysis and/or statistical analysis. For example, the statistical processing unit 14 may also determine whether or not the write data are recorded data based on moving average information associated with a data amount of each piece of write data. Here, the moving average information is information obtained by obtaining an average value of each predetermined period in time-series data while shifting periods and is information obtained by smoothing the time-series data.

In the present embodiment, a file and data may also be referred to as information.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A storage device comprising:
   a non-volatile memory;
   an interface circuit configured to be electrically connected to a host device and be capable of communicating with the host device;
   a first control circuit configured to perform control of writing write data received from the host device via the interface circuit into the non-volatile memory;
   a wireless transmitting and receiving circuit configured to be capable of wirelessly communicating with a wireless device; and
   a second control circuit configured to determine whether or not the write data received via the interface circuit include a predetermined type of data based on measurement data associated with the write data, and stop wireless communication performed by the wireless transmitting and receiving circuit in a case where it is determined that the write data include the predetermined type of data, wherein
   the second control circuit is configured to restart the wireless communication performed by the wireless transmitting and receiving circuit in a case where the second control circuit determines that new write data received from the host device via the interface circuit do not include the predetermined type of data after the wireless communication performed by the wireless transmitting and receiving circuit is stopped.

2. The storage device according to claim 1, wherein
   the predetermined type of data is data which includes at least audio data, and of which noise mixed during the write data are written into the non-volatile memory while performing the wireless communication is to be suppressed.

3. The storage device according to claim 1, wherein
   the second control circuit is configured to stop the wireless communication in a case where the second control circuit determines that the write data include the predetermined type of data while performing the wireless communication.

4. The storage device according to claim 1, wherein
   the measurement data include time information and a data amount associated with the write data, and
   the second control circuit is configured to calculate a data amount per unit time of the write data being received via the interface circuit and to be written by the first control circuit into the non-volatile memory, based on the measurement data, and determine that the write data are the predetermined type of data in a case where a time, for which the data amount per unit time continuously exceeds a first threshold value, exceeds a second threshold value.

5. The storage device according to claim 4, wherein
   the non-volatile memory stores first information indicating a location of information stored in the non-volatile memory, and second information including the first threshold value and the second threshold value, and
   the second control circuit is configured to
   read the first information from the non-volatile memory via the first control circuit, and
   read the second information from the non-volatile memory via the first control circuit based on the read first information.

6. The storage device according to claim 5, wherein
   the second control circuit includes a file system, and
   the file system is configured to identify a location of the second information stored in the non-volatile memory based on the first information read from the non-volatile memory via the first control circuit.

7. The storage device according to claim 1, wherein
   the measurement data include time information and a data amount associated with the new write data, and
   the second control circuit is configured to calculate a data amount per unit time of the new write data being received via the interface circuit and to be written by the first control circuit into the non-volatile memory, based on the measurement data, and determine that the new write data do not include the predetermined type of data in a case where a time, for which the data amount per unit time is continuously equal to or less than a first threshold value, exceeds a third threshold value.

8. The storage device according to claim 1, wherein
   the measurement data include statistical data usable for statistical processing, and
   the second control circuit is configured to determine whether or not the write data include the predetermined type of data by the statistical processing based on the statistical data.

9. A control method of a memory system capable of communication with a host device via an interface circuit and capable of wirelessly communicating with a wireless device via a wireless transmitting and receiving circuit, comprising:

receiving write data from the host device via the interface circuit;

determining whether or not the write data received via the interface circuit include a predetermined type of data based on measurement data associated with the write data; and stopping wireless communication performed in the memory system in a case where it is determined that the write data include the predetermined type of data, wherein the control method further comprising restarting the wireless communication performed by the memory system in a case where the memory system determines that new write data received from the host device do not include the predetermined type of data after the wireless communication performed by the memory system is stopped.

10. The method according to claim 9, wherein the measurement data include time information and a data amount associated with the write data, and the determining includes calculating a data amount per unit time of the write data being received by the memory system and to be written into a non-volatile memory of the memory system, based on the measurement data, and determining that the write data are the predetermined type of data in a case where a time, for which the data amount per unit time continuously exceeds a first threshold value, exceeds a second threshold value.

11. A storage device comprising:

a non-volatile memory;

an interface circuit configured to be electrically connected to a host device and be capable of communicating with the host device;

a wireless transmitting and receiving circuit configured to be capable of wirelessly communicating with a wireless device; and a control circuit configured to perform control of writing write data received from the host device via the interface circuit into the non-volatile memory, and perform control of enabling or disabling wireless communication performed by the wireless transmitting and receiving circuit in accordance with a data amount of the write data received via the interface circuit and a time required for reception of the write data wherein the control circuit is configured to perform, after the disabling the wireless communication performed by the wireless transmitting and receiving circuit, the control of enabling or disabling the wireless communication in accordance with the an amount of new write data received from the host device via the interface circuit and a time required for reception of the new write data.

12. The storage device according to claim 11, wherein the control circuit is configured to perform the control of disabling the wireless communication in accordance with the data amount and the time, in a case where the wireless transmitting and receiving circuit is in the wireless communication and the control circuit starts a write operation of writing the write data into the non-volatile memory.

13. The storage device according to claim 11, wherein the control circuit is configured to perform control of disabling the wireless communication in a case where a time, for which a data amount per unit time of the write data received via the interface circuit and to be written into the non-volatile memory continuously exceeds a first threshold value, exceeds a second threshold value.

14. The storage device according to claim 13, wherein the non-volatile memory stores first information indicating a location of information stored in the non-volatile memory, and second information including the first threshold value and the second threshold value, and the second control circuit is configured to read the first information from the non-volatile memory, and read the second information from the non-volatile memory based on the read first information.

15. The storage device according to claim 14, wherein the control circuit includes a file system, and the file system is configured to identify a location of the second information stored in the non-volatile memory based on the first information read from the non-volatile memory.

16. The storage device according to claim 11, wherein the control circuit is configured to perform the control of enabling the wireless communication in a case where a time, for which a data amount per unit time of the new write data received via the interface circuit and to be written into the non-volatile memory is continuously equal to or less than a first threshold value, exceeds a third threshold value.

17. The storage device according to claim 11, wherein the control circuit is configured to perform the control of enabling or disabling the wireless communication in accordance with a result of statistical processing for a data amount of the write data and a time required for reception of the write data.

* * * * *